United States Patent
Hofmann et al.

(10) Patent No.: US 9,738,790 B2
(45) Date of Patent: Aug. 22, 2017

(54) PROCESS FOR FORMING CORROSION PROTECTION LAYERS ON METAL SURFACES

(75) Inventors: Udo Hofmann, Darmstadt (DE); Volker Krenzel, Florsheim (DE)

(73) Assignee: Atotech Deutschland GmbH, Berlin (DE)

( * ) Notice: Subject to any disclaimer, the term of this patent is extended or adjusted under 35 U.S.C. 154(b) by 265 days.

(21) Appl. No.: 13/699,322

(22) PCT Filed: May 26, 2010

(86) PCT No.: PCT/EP2010/057241
§ 371 (c)(1),
(2), (4) Date: Nov. 21, 2012

(87) PCT Pub. No.: WO2011/147447
PCT Pub. Date: Dec. 1, 2011

(65) Prior Publication Data
US 2013/0078382 A1    Mar. 28, 2013

(51) Int. Cl.
| | |
|---|---|
| *C23C 28/00* | (2006.01) |
| *C23C 28/04* | (2006.01) |
| *B05D 1/36* | (2006.01) |
| *B05D 3/02* | (2006.01) |
| *C25D 5/12* | (2006.01) |
| *C25D 5/14* | (2006.01) |
| *C25D 5/48* | (2006.01) |
| *C25D 5/50* | (2006.01) |
| *C25D 9/00* | (2006.01) |
| *C25D 9/12* | (2006.01) |
| *C09D 5/08* | (2006.01) |
| *C23C 22/36* | (2006.01) |
| *C23C 22/73* | (2006.01) |
| *C25D 5/36* | (2006.01) |
| *C25D 11/38* | (2006.01) |

(52) U.S. Cl.
CPC .............. *C09D 5/08* (2013.01); *C23C 22/362* (2013.01); *C23C 22/73* (2013.01); *C25D 5/36* (2013.01); *C25D 11/38* (2013.01); *C23C 2222/10* (2013.01)

(58) Field of Classification Search
CPC ... B05D 1/00; B05D 5/00; B05D 7/08; B05D 7/14; B05D 1/36; B05D 3/02; C23C 22/83; C23C 22/34; C23C 28/321; C23C 10/60; C23C 10/32; C23C 10/38; C23C 28/00; C23C 28/04; C25D 5/12; C25D 5/14; C25D 5/48; C25D 5/50; C25D 9/00; C25D 9/12

USPC ....... 205/191, 194, 197, 198, 199, 201, 224, 205/229; 428/472.1, 628; 106/14.21; 148/251, 258; 427/419.3, 372.2
See application file for complete search history.

(56) References Cited

U.S. PATENT DOCUMENTS

| | | | | |
|---|---|---|---|---|
| 3,279,958 A | * | 10/1966 | Maurer et al. | 148/252 |
| 3,932,198 A | * | 1/1976 | Schneider | 148/265 |
| 4,196,063 A | * | 4/1980 | Barnes | C25D 3/06 205/243 |
| 4,263,059 A | * | 4/1981 | Guhde | C23C 22/34 106/453 |
| 4,293,620 A | * | 10/1981 | Vigar | C25D 3/06 205/179 |
| 4,328,046 A | * | 5/1982 | Fuchs | 148/265 |
| 4,586,989 A | * | 5/1986 | Rasmussen | 205/99 |
| 6,287,704 B1 | * | 9/2001 | Preikschat | C23C 22/34 106/14.21 |
| 2005/0109426 A1 | * | 5/2005 | Inoue | C23C 22/17 148/258 |
| 2007/0023104 A1 | | 2/2007 | Yamamoto et al. | |
| 2010/0133113 A1 | | 6/2010 | Krizova et al. | |

FOREIGN PATENT DOCUMENTS

| | | | | |
|---|---|---|---|---|
| DE | 136979 | | 8/1979 | |
| DE | 136979 A | * | 8/1979 | ............ C23C 22/30 |
| JP | 50102538 A | * | 8/1975 | ............ C25D 5/26 |
| JP | 2003171778 | | 6/2003 | |
| JP | 2005023372 | | 1/2005 | |
| JP | 2005023372 A | * | 1/2005 | ............ C23C 22/30 |
| WO | 2011000969 | | 1/2011 | |

OTHER PUBLICATIONS

Y.B Song, D.-T Chin, "Current efficiency and polarization behavior of trivalent chromium electrodeposition process", Electrochimica Acta, vol. 48, Issue 4, Dec. 20, 2002, pp. 349-356, ISSN 0013-4686.*
PCT/EP2010/057241; PCT International Search Report and Written Opinion of the International Searching Authority dated Jan. 24, 2011.

* cited by examiner

*Primary Examiner* — Edna Wong
(74) *Attorney, Agent, or Firm* — Renner, Otto, Boisselle & Sklar, LLP

(57) ABSTRACT

The invention relates to a process for producing a corrosion-inhibiting coating for substrates having a surface consisting of zinc, magnesium, aluminum or one of their alloys, wherein the surface to be treated is brought into contact in direct succession with two aqueous treatment solutions containing chromium(III) ions, metal ions of the substrate surface to be treated and at least one complexing agent. The first treatment solution has a pH in the range from 1.0 to 4.0, while the second treatment solution has a pH of from 3.0 to 12.0. The process of the invention produces a smaller amount of wastewater polluted with heavy metals.

13 Claims, No Drawings

PROCESS FOR FORMING CORROSION PROTECTION LAYERS ON METAL SURFACES

FIELD OF THE INVENTION

The present invention relates to a process for producing essentially chromium(VI)-free corrosion protection layers on surfaces of zinc, aluminium or magnesium and also alloys of these metals.

BACKGROUND OF THE INVENTION

The use of conversion layers for increasing the protective action of cathodic corrosion protection systems and as primer for varnishes and paints has been known for a long time. In addition to phosphating methods, the method of chromating the surfaces has become established, especially for zinc-, aluminium- and magnesium-containing substrates.

Here, the surface to be treated is exposed to a treatment solution whose essential constituents are chromium(VI) compounds. The conversion layer produced therefore also contains chromium(VI) ions. Chromating layers generally display good corrosion protection and good decorative properties. A disadvantage of the use of chromium(VI)-containing solutions or chromium(VI)-containing coatings is the toxicological properties of chromium(VI) compounds. The use of chromium(VI)-containing conversion layers is therefore greatly restricted by, for example, the EC Directive 2000/53/EC (EC old vehicle directive).

As an alternative to chromating solutions, chromium(III)-containing, acid treatment solutions, which in contrast to chromatings are generally referred to as "passivations" or "passivation solutions", have been proposed. These treatment solutions consist, as proposed, for example, in DE 196 15 664 A1, essentially of a chromium(III) salt in mineral acid solution, a dicarboxylic acid or hydroxycarboxylic acid and a cobalt salt. Such processes known as "thick film passivations" are employed at elevated temperature, about 40-60° C., to achieve a passivation layer thickness sufficient for corrosion protection on zinc surfaces. The necessity of carrying out the process at a temperature above room temperature results from the great lack of reactivity characteristic of chromium(III) ions in contrast to chromium(VI) ions. A significant increase in the reaction times as an alternative to an increase in the temperature is generally not feasible for economic reasons.

As an alternative, Cr(VI)-free black conversion layers can be produced on zinc-nickel alloy layers by treatment with acidic, chromium(III)-containing solutions which additionally contain oxo acids of phosphorus, as described in U.S. Pat. No. 5,415,702. In this process, homogeneous black conversion layers having good decorative properties are formed.

WO 03/05429 describes a similar conversion layer which is likewise produced using a chromium(III)-containing, acidic treatment solution which additionally contains phosphate ions. This surface, too, has good decorative properties but without further after-treatment steps such as sealing does not achieve satisfactory corrosion protection properties.

EP 1 484 432 A1 describes chromium(III)-containing black passivation solutions containing chromium(III) ions and nitrate and also carboxylic acids such as tartaric acid, maleic acid, oxalic acid, succinic acid, citric acid, malonic acid or adipic acid for zinc alloy surfaces. To improve the corrosion protection, the surfaces treated with the solutions have to be subjected to subsequent sealing. The treatment solutions are employed at temperatures above normal room temperature.

US 2004/0156999 likewise describes a process for the black passivation of zinc alloy surfaces. The treatment solutions contain chromium(III) ions and phosphorus-containing anions and also nitrate and an organic carboxylic acid. Examples given for the organic carboxylic acids are citric acid, tartaric acid, maleic acid, glyceric acid, lactic acid, glycolic acid, malonic acid, succinic acid, oxalic acid and glutaric acid.

Essentially, the following process steps are carried out in the production of the protective layers: activation of the metal surface, production of the conversion layer in an acidic passivation bath, removal of the aggressive passivation bath liquid from the surface by means of one or more rinsing operations, drying and application of a further sealer or after-dipping in an after-dipping solution and drying.

This procedure has the disadvantage that rinsing wastewater contaminated with considerable quantities of heavy metals and possibly complexing agents are formed and have to be disposed of or worked up in a complicated and costly manner.

Owing to these disadvantages, efforts have recently been made to develop "no rinse" processes. Here, conversion layers which contain a metal component which increases the passivation, e.g. chromium, titanium or zirconium, and also a film-forming component composed of an organic polymer are essentially applied. These processes are used predominantly for the treatment of aluminium surfaces. "No rinse" phosphating processes in combination with film-forming polymers are also frequently described.

Thus, for example, the document U.S. Pat. No. 6,117,251 describes an aqueous solution containing zinc oxide, phosphoric acid, polyvinyl alcohol and a further metal salt for zinc-phosphating of metal surfaces.

These processes have only very limited use for surfaces of zinc, aluminium and magnesium since although they form films embedded in an organic matrix, no closed chromium oxide layer or surface metal mixed oxide layer, as is necessary for satisfactory corrosion protection, is formed.

DESCRIPTION OF THE INVENTION

It is an object of the invention to provide a process for the chromium(VI)-free passivation of metal surfaces of zinc, aluminium or magnesium and also alloys of the metals, by means of which the surfaces are given very good corrosion-protection properties while at the same time no contaminated rinsing water is obtained.

This object is achieved by a process for forming corrosion protection layers on surfaces of zinc, aluminium or magnesium and also alloys of the metals, which comprises the following steps:

i) contacting of the surface of the metals or metal alloys mentioned with a solution comprising
   chromium(III) ions, metal ions selected from the surface metal or the surface metal alloy
   and at least one complexing agent selected from the group consisting of carboxylic acids, polycarboxylic acids, hydroxycarboxylic acids, aminocarboxylic acids, alcohols, amines and ethers,
   where the treatment solution has a pH of from 1.0 to 4.0,
ii) then direct contacting of the surface of the metals mentioned with a solution comprising
   chromium(III) ions, metal ions selected from the surface metal or the surface metal alloy and at least one complexing agent selected from the group consisting of carboxylic acids, polycarboxylic acids, hydroxycarboxylic acids, aminocarboxylic acids, alcohols, amines and ethers, where the treatment solution has a pH of from 3.0 to 12.0.

The process for forming corrosion protection layers on the metal and metal alloy surfaces mentioned is characterized in that the metal surface is passivated in the first step of the process and an after-treatment in a solution having approximately the same composition is carried out in the second step. The after-treatment fixes the passivation layer on the metal surface and thus leads to durable corrosion protection. Since solutions having essentially the same composition are employed in both steps, a rinsing operation which is absolutely necessary in the prior-art processes between the treatment steps in order to avoid entrainment and achieve good corrosion protection can be omitted. The rinsing operation which is necessary in known processes leads to wastewater which is polluted with heavy metal ions and other chemicals and has to be disposed of and purified at considerable expense and leads to pollution of the environment.

The process of the invention makes it possible for the first time to use solutions which have an essentially identical composition both for the passivation and for the after-treatment without the corrosion protection of the surface being adversely affected.

The targeted setting of different pH values of the solutions in the two steps enables the function of the treatment solutions which are identical per se to be controlled.

The treatment solution used in step 1, which consists essentially of a chromium(III) salt and a complexing agent for the metal zinc, magnesium or aluminium and alloys thereof, is set to a pH of from 1.0 to 4.0, preferably from 1.2 to 3.0, most preferably from 1.5 to 2.5. Depending on the initial pH of the solution, acids or bases can be used for this purpose. Sulphuric acid and nitric acid are particularly suitable as acids. As bases, preference is given to using alkali metal hydroxides, in particular NaOH and KOH.

Chromium(III) ions can be added to the treatment solutions of treatment steps 1 and 2 either in the form of inorganic chromium(III) salts such as basic chromium(III) sulphate, chromium(III) hydroxide, chromium(III) dihydrogenphosphate, chromium(III) chloride, chromium(III) nitrate, potassium chromium(III) sulphate or chromium(III) salts of organic acids, e.g. chromium(III) methanesulphonate, chromium(III) citrate, or are generated by reduction of suitable chromium(VI) compounds in the presence of suitable reducing agents. Suitable chromium(VI) compounds are, for example, chromium(VI) oxide, chromates such as potassium or sodium chromate, dichromates such as potassium or sodium dichromate. Suitable reducing agents for in-situ generation of chromium(III) ions are, for example, sulphites such as sodium sulphite, sulphur dioxide, phosphites such as sodium hypophosphite, phosphonic acid, hydrogen peroxide, methanol, gluconic acid. Chromium(III) ions can also be added in the form of a mixture of an inorganic chromium(III) salt, a chromium(VI) salt and a suitable reducing agent.

Both treatment solutions contain chromium(III) ions in an amount of from 0.5 to 10 g/l, preferably from 2 to 6 g/l and most preferably from 2.5 to 3.5 g/l.

The treatment solution of step 1 generally has a temperature of from 10 to 40° C., preferably from 20 to 30° C.

The treatment time in the treatment solution is preferably in the range from 10 to 600 s, more preferably from 20 to 120 s, most preferably from 30 to 90 s.

In a preferred embodiment of the process, the passivating treatment is aided by connecting the substrate as cathode in the passivation solution. Here, the cathodic current density on the substrate is preferably in the range from 0.05 to 10 $A/dm^2$, more preferably from 0.1 to 5 $A/dm^2$, most preferably from 0.1 to 3 $A/dm^2$.

It is presumed that, in the first step, the passivation reaction by the chromium(III)-containing species in the treatment solution occurs significantly preferentially at the strongly acidic pH values which are set. As a result, an impervious passivation layer is very reliably formed over the full area of the metal surface of zinc, magnesium or aluminium and alloys thereof in this step. However, this layer is not yet particularly durable, in particular has little resistance to mechanical stress.

The passivation layer formed in the first step is therefore fixed and thus made durable in the second step.

The treatment solution in step 2 likewise consists essentially of a chromium(III) salt and a complexing agent for the metal zinc, magnesium or aluminium and also their alloys. This solution is set to a pH of from 2.0 to 12.0, preferably from 3.0 to 7.0, most preferably from 3.5 to 5.0. Depending on the initial pH of the solution, acids or bases can be used for this purpose. Sulphuric acid and nitric acid are particularly suitable as acids. As bases, preference is given to using alkali metal hydroxides, in particular NaOH and KOH.

The treatment solution of step 2 generally has a temperature of from 10 to 70° C., preferably from 40 to 60° C.

The treatment time in the treatment solution is preferably in the range from 5 to 600 s, more preferably from 8 to 120 s, most preferably from 10 to 90 s.

In the second step, the passivating component of the treatment solution actually does not play any role, so that the process can be modified by the solution in the second step initially consisting only of the complexing agent and approaching the composition of the treatment solution of step 1 and step 2 only during the course of the production process as a result of entrainment.

It is presumed that, in the second step, the fixing reaction by the complexing agents in the treatment solution occurs significantly preferentially at the less acidic, neutral or alkaline pH values which are set. As a result, the passivation layer which has previously been applied over the full area of the metal surface is durably fixed in this step. A durable corrosion protection layer which withstands mechanical and other stresses over long periods of time is formed on the surface only as a result of this step.

Zinc, magnesium or aluminium or alloys thereof can be deposited electrochemically on a substrate or have been applied by other methods such as hot galvanizing or make up the material of the article to be treated. Such processes are known to those skilled in the art.

Conventional, chromium(VI)-free passivation solutions for zinc-containing surfaces generally comprise a source of chromium(III) ions and one or more complexing agents. Such solutions are known to those skilled in the art. The pH of the treatment solutions is generally less than 2.

In the two steps of the process of the invention, the complexing agent is selected from the group consisting of carboxylic acids, polycarboxylic acids, hydroxycarboxylic acids, aminocarboxylic acids, alcohols, ethers and amines.

Suitable complexing agents are formic acid, acetic acid, propionic acid, butyric acid, isobutyric acid, valeric acid, hexanecarboxylic acid, cyclopentanecarboxylic acid, acetylsalicylic acid, benzoic acid, nitrobenzoic acid, 3,5-dinitrobenzoic acid, tetrahydrofuran-2-carboxylic acid, sorbic acid, oxalic acid, malonic acid, succinic acid, glutaric acid, adipic acid, pimelic acid, suberic acid, azelaic acid, sebacic acid, maleic acid, phthalic acid, terephthalic acid, ethylenedinitrilotetraacetic acid, ethylenediaminetetraacetic acid, diethylenediaminepentaacetic acid, nitrilotriacetic acid, tartaric acid, citric acid, isocitric acid, malic acid, ascorbic acid, lactic acid, gluconic acid, glucuronic acid, gallic acid, methanol, ethanol, 1-propanol, 2-propanol, 1-butanol, 2-butanol, 1-pentanol, ethylene glycol, propylene glycol, butyl glycol and glycol ethers.

The amount of all complexing agents in each of the two treatment solutions is in each case from 0.75 to 200 g/l, preferably from 5 to 100 g/l, most preferably from 10 to 50 g/l.

When the surface to be treated consists of zinc or a zinc alloy, the two treatment solutions contain a water-soluble zinc compound in an amount of in each case from 0.75 to 200 mmol/l, preferably from 3 to 100 mmol/l, most preferably from 10 to 40 mmol/l.

When the surface to be treated consists of magnesium or a magnesium alloy, the two treatment solutions contain a water-soluble magnesium compound in an amount of in each case from 2 to 210 mmol/l, preferably from 8 to 75 mmol/l, most preferably from 12 to 40 mmol/l.

When the surface to be treated consists of aluminium or an aluminium alloy, the two treatment solutions contain a water-soluble aluminium compound in an amount of in each case from 1.8 to 185 mmol/l, preferably from 7.5 to 85 mmol/l, most preferably from 11 to 40 mmol/l.

The two baths in the treatment steps 1 and 2 optionally contain a source of fluoride ions which is selected from the group consisting of NaF, KF, $NH_4F$, $NaHF_2$, $KHF_2$ and $NH_4HF_2$. Fluoride ions are added in an amount of in each case from 0.001 to 10 g/l, preferably from 0.01 to 5 g/l and most preferably from 0.05 to 2 g/l.

The two baths in treatment steps 1 and 2 optionally contain a source of chloride ions which is selected from the group consisting of NaCl, KCl and $NH_4Cl$. Chloride ions are added in an amount of in each case from 0.01 to 20 g/l, preferably from 0.1 to 10 g/l and most preferably from 0.5 to 5 g/l.

A further, optional component in the two baths of treatment steps 1 and 2 is phosphate compounds, with the at least one phosphate compound being selected from the group consisting of orthophosphoric acid, polyphosphoric acids, metaphosphoric acid, the salts of these acids, the esters of these acids having organic radicals having up to 12 carbon atoms and mixtures of these compounds. The phosphate compound is added in an amount of in each case from 0.5 to 100 g/l, preferably from 3 to 50 g/l and most preferably from 5 to 20 g/l.

To increase the corrosion protection, at least one metal or metalloid selected from the group consisting of Sc, Y, Ti, Zr, Mo, W, Mn, Fe, Co, Ni, Zn, B, Al, Si is optionally added to the two treatment solutions in treatment steps 1 and 2. These elements can be added in the form of their salts or in the form of complex anions or the corresponding acids of these anions, e.g. hexafluoroboric acid, hexafluorosilicic acid, hexafluorotitanic acid or hexafluorozirconic acid, tetrafluoroboric acid or hexafluorophosphoric acid or salts thereof.

The process of the invention can be used in very many passivation systems. Excellent corrosion protection values for black passivations are achieved when soluble cobalt salts in an amount of in each case from 0.2 to 3 g/l, preferably from 0.5 to 1 g/l, are added to each of the baths in treatment steps 1 and 2.

For the after-treatment, the substrate which has been taken from the treatment solution 2 is dried without prior rinsing. Drying can, for example, be carried out in a drum. Residues of the treatment solution 2 adhering in the drum can be removed by means of hot alkaline solutions.

EXAMPLE

Aqueous reaction solutions having the following composition were produced:

Reaction solution 1 for step 1:

3.61 g/l of Cr(III) ions added as 74% strength by weight chromium(III) nitrate solution, 10.9 g/l of phosphate ions, 2.5 g/l of zinc ions, 12.1 g/l of gluconic acid, 10 g/l of tartaric acid, 0.088 g/l of fluoride ions and 1.22 g/l of chloride ions.

The pH of the solution was set to 1.8 by means of nitric acid.

Reaction solution for step 2:

3.61 g/l of Cr(III) ions added as 74% strength by weight chromium(III) nitrate solution, 10.9 g/l of phosphate ions, 2.5 g/l of zinc ions, 12.1 g/l of gluconic acid, 10 g/l of tartaric acid, 0.088 g/l of fluoride ions and 1.22 g/l of chloride ions.

The pH of the solution was set to 4 by means of sodium hydroxide.

A steel component was coated with a 10 μm thick zinc layer in an acidic zinc electrolyte (trade name: Unizink NCZ 420 from Atotech Deutschland GmbH). The steel component was then dipped for 10 s into a nitric acid/water mixture (about 0.2% of $HNO_3$) at 20° C. in order to activate the surface. The part was subsequently rinsed with demineralized water and immediately dipped into the reaction solution 1, made up as described above, at 25° C. for 40 s. Without a further rinsing step, the part was then immediately dipped into the reaction solution 2, made up as described above, at 50° C. for 15 s. After allowing the treatment solution to drip off, the part was, without a final rinsing step, dried at 120° C. for 15 minutes.

In the salt spray mist test in accordance with DIN 50021 SS, the surface remained unchanged for 400 h, displayed 5% white rust corrosion only after 700 h and red rust corrosion only after more than 1000 h. The corrosion protection achieved by means of the process of the invention is at least as good as that which can be achieved by processes known from the prior art, with the difference that the amount of wastewater polluted with heavy metals is significantly reduced in the process of the invention.

The invention claimed is:

1. Process for forming corrosion protection layers on a surface of a metal or metal alloy, wherein the metal is zinc, aluminium or magnesium, which comprises the following steps:
  i) contacting of the surface of the metal or metal alloy with a first treatment solution comprising
    chromium(III) ions,
    metal ions selected from the metal or metal alloy, and
    at least one complexing agent selected from the group consisting of carboxylic acids, polycarboxylic acids, hydroxycarboxylic acids, aminocarboxylic acids, alcohols, amines and ethers,
  where the first treatment solution has a pH of 1.0-3.0,
    wherein the contacting the surface of the metal or metal alloy with the first treatment solution forms a passivation layer on the surface;

ii) then direct contacting of the passivation layer without a rinsing operation with a second treatment solution comprising
chromium(III) ions,
metal ions selected from the metal or metal alloy, and
at least one complexing agent selected from the group consisting of carboxylic acids, polycarboxylic acids, hydroxycarboxylic acids, aminocarboxylic acids, alcohols, amines and ethers,
where the second treatment solution has a pH of 3.0-12.0, and iii) drying directly after contacting with the two treatment solutions without a final rinsing step, wherein the direct contacting in ii) without a rinsing operation with the second treatment solution durably fixes the corrosion protection layers to the surface,
wherein the first treatment solution and the second treatment solution have the same composition but are set to different pH values by addition of acid or base to set pH to the first treatment solution and to the second treatment solution.

2. Process according to claim 1, wherein the two treatment solutions each contain from 0.5 to 200 g/l of the complexing agent.

3. Process according to claim 1, wherein both treatment solutions contain at least one water-soluble cobalt compound.

4. Process according to claim 1, wherein the two treatment solutions each contain at least one phosphate compound selected from the group consisting of orthophosphoric acid, polyphosphoric acids, metaphosphoric acid, the salts of these acids, the esters of these acids with organic radicals having up to 12 carbon atoms and mixtures of these compounds.

5. Process according to claim 1, wherein both treatment solutions contain fluoride ions in an amount from 0.001 to 10 g/l.

6. Process according to claim 1, wherein both treatment solutions contain chloride ions in an amount from 0.1 to 10 g/l.

7. Process according to claim 1, wherein the treatment solution in step i) has a temperature of from 10 to 50° C.

8. Process according to claim 1, wherein the treatment solution in step ii) has a temperature of from 10 to 80° C.

9. Process according to claim 1, wherein the treatment time in the treatment solution in both steps is in the range from 10 to 600 s.

10. Process according to claim 1, wherein soluble chromium(III) ions are added in an amount of from 0.5 to 10 g/l to each of the two treatment solutions.

11. Process according to claim 1, wherein the contacting in step i) is aided by connecting the substrate as cathode in the first treatment solution.

12. Process according to claim 11, wherein a cathodic current density applied to the substrate is in the range from 0.05 to 10 A/dm$^2$.

13. Process for forming corrosion protection layers on a surface of a metal or metal alloy, wherein the metal is zinc, aluminium or magnesium, which comprises the following steps:
preparing a first treatment solution comprising
chromium(III) ions,
metal ions selected from the metal or metal alloy, and
at least one complexing agent selected from the group consisting of carboxylic acids, polycarboxylic acids, hydroxycarboxylic acids, aminocarboxylic acids, alcohols, amines and ethers,
preparing a second treatment solution comprising
chromium(III) ions,
metal ions selected from the metal or metal alloy, and
at least one complexing agent selected from the group consisting of carboxylic acids, polycarboxylic acids, hydroxycarboxylic acids, aminocarboxylic acids, alcohols, amines and ethers,
wherein the first treatment solution and the second treatment solution have the same composition;
adjusting pH of the first treatment solution to a pH of 1.0-3.0 by addition of acid or base;
adjusting pH of the second treatment solution to a pH of 3.0-12.0 by addition of acid or base, and
wherein the first treatment solution and the second treatment solution are adjusted to different pH values;

i) contacting the surface of the metal or metal alloy with the first treatment solution to form a passivation layer on the surface;

ii) without a rinsing operation, contacting the passivation layer with the second treatment solution;

iii) drying directly after contacting with the two treatment solutions without a final rinsing step, wherein the direct contacting in ii) without a rinsing operation with the second treatment solution durably fixes the corrosion protection layers to the surface.

* * * * *